US011361375B2

(12) United States Patent
Mager

(10) Patent No.: US 11,361,375 B2
(45) Date of Patent: Jun. 14, 2022

(54) MORTGAGE ACQUISITION SYSTEM

(71) Applicant: Eric Nicholas Mager, Charlotte, NC (US)

(72) Inventor: Eric Nicholas Mager, Charlotte, NC (US)

(73) Assignee: BUNDLE MARKETPLACE, INC., Charlotte, NC (US)

( * ) Notice: Subject to any disclaimer, the term of this patent is extended or adjusted under 35 U.S.C. 154(b) by 0 days.

(21) Appl. No.: 16/392,787

(22) Filed: Apr. 24, 2019

(65) Prior Publication Data
US 2019/0333145 A1    Oct. 31, 2019

Related U.S. Application Data

(60) Provisional application No. 62/663,917, filed on Apr. 27, 2018.

(51) Int. Cl.
*G06Q 40/02* (2012.01)
*G06Q 50/16* (2012.01)

(52) U.S. Cl.
CPC .......... *G06Q 40/025* (2013.01); *G06Q 50/16* (2013.01)

(58) Field of Classification Search
CPC ....... G06Q 40/025; G06Q 40/02; G06Q 50/16
See application file for complete search history.

(56) References Cited

U.S. PATENT DOCUMENTS

| 8,793,183 | B2 * | 7/2014 | Bramlage | G06Q 30/08 705/38 |
| 2004/0249705 | A1 * | 12/2004 | Spencer | G06Q 30/0269 705/14.46 |
| 2010/0070406 | A1 * | 3/2010 | Stein | G06Q 40/02 705/38 |
| 2010/0174658 | A1 * | 7/2010 | Marlow | G06Q 40/00 705/313 |
| 2012/0066176 | A1 * | 3/2012 | Martignoni | G06Q 50/18 707/E17.005 |
| 2015/0278971 | A1 * | 10/2015 | Moon | G06Q 30/06 705/313 |
| 2015/0317728 | A1 * | 11/2015 | Nguyen | G06Q 40/025 705/38 |

(Continued)

OTHER PUBLICATIONS

Robertson, Colin, Magilla Lets You Shop Mortgage Lenders Anonymously, Jul. 18, 2018, Mortgage News. Retrieved on Mar. 30, 2022 at https://www.thetruthaboutmortgage.com/magilla-lets-you-shop-mortgage-lenders-anonymously/ (Year: 2018).*

(Continued)

*Primary Examiner* — Scott A Zare
(74) *Attorney, Agent, or Firm* — Oliff PLC

(57) ABSTRACT

A method for a mortgage acquisition system is disclosed. A real estate agent invites a home buyer to the mortgage acquisition system. The home buyer submits information to the system through forms and a messaging portal. The system presents this information to potential lenders, and specifically excludes the home buyer's personal identifying information (PII). The lender uses that information to submit information and mortgage terms to the customer. The home buyer decides on a mortgage lender based on the information and terms provided.

6 Claims, 19 Drawing Sheets

(56) References Cited

U.S. PATENT DOCUMENTS

2016/0140654 A1* 5/2016 Bhat ................ G06Q 10/06316
　　　　　　　　　　　　　　　　　　　　　　　　　705/7.26
2016/0323247 A1* 11/2016 Stein ................... H04L 63/0421
2018/0137584 A1* 5/2018 Carmichael ............ G06Q 50/16

OTHER PUBLICATIONS

LoanAgentsLive.com. Retrieved on Mar. 31, 2022 via the wayback machine at https://web.archive.org/web/20090202181408/http://www.loanagentslive.com:80/ (Year: 2009).* www.magillaloans.com Retrieved on Mar. 31, 2022 via the wayback machine at htts://web.archive.org/web/20180307114352/https://www.magillaloans.com/ (Year: 2018).*

* cited by examiner

102 — A HOME BUYER OR HOME OWNER (POTENTIAL BORROWER) DETERMINES THEY NEED A MORTGAGE LOAN TO COVER, IN PART OR IN WHOLE, A PORTION OF THE HOME PRICE OR HOME VALUE.

104 — THE POTENTIAL BORROWER DETERMINES THEY WILL COMPARE LENDERS BY SHOPPING AROUND.

106 — THE POTENTIAL BORROWER ACCESSES THE MORTGAGE ACQUISITION SYSTEM THROUGH A USER INTERFACE.

108 — THE POTENTIAL BORROWER ANONYMOUSLY MESSAGES WITH AND REQUESTS MORTGAGE TERMS FROM MORTGAGE LOAN ORIGINATORS.

110 — THE POTENTIAL BORROWER CHOOSES A MORTGAGE LOAN ORIGINATOR.

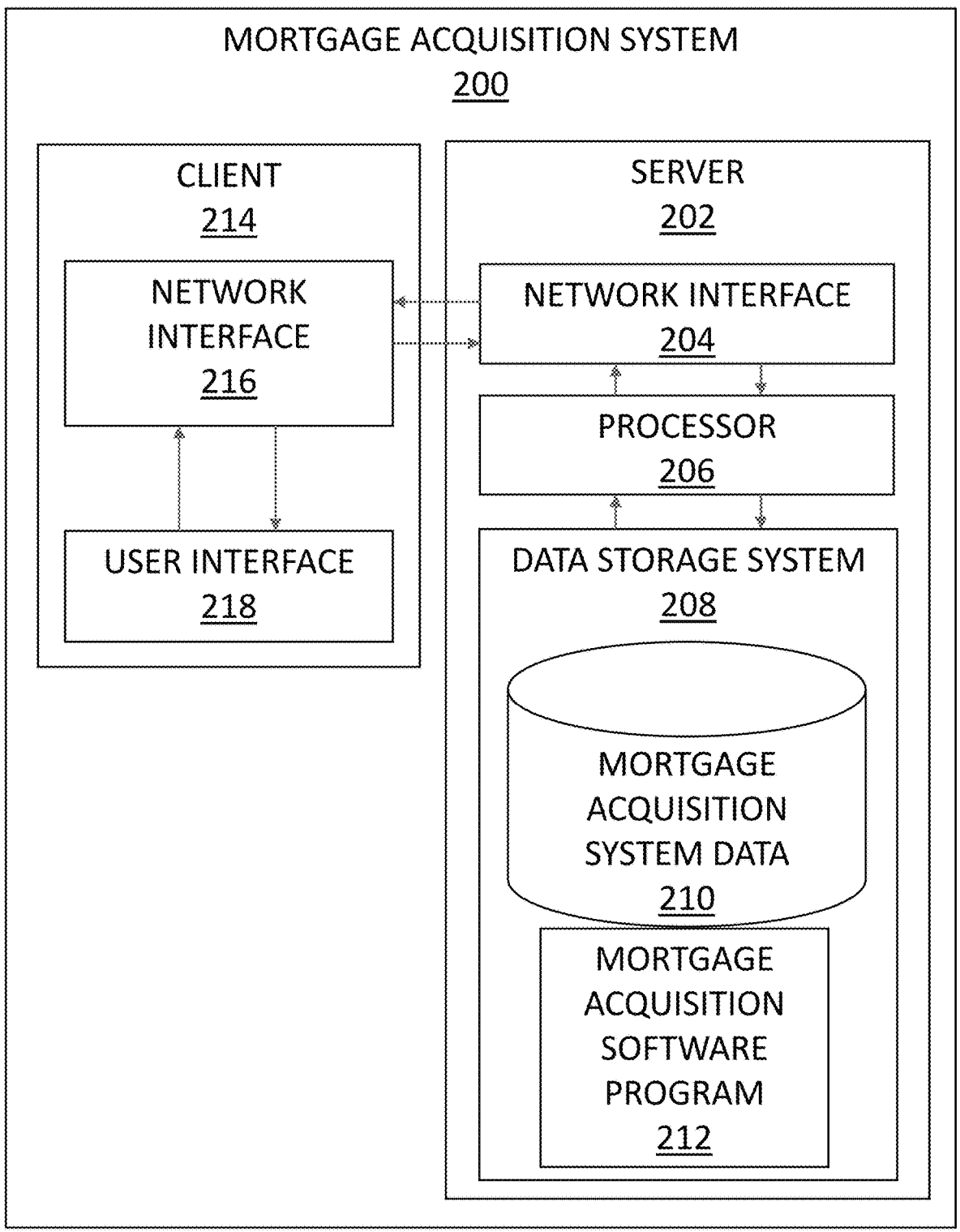

302 — A USER ACCESSES THE GENERAL USER INTERFACE

304 — WHAT TYPE OF USER?

306 — MORTGAGE LOAN ORIGINATOR

308 — REAL ESTATE AGENT

310 — POTENTIAL BORROWER

312 — RENDER MORTGAGE LOAN ORIGINATOR USER INTERFACE

314 — RENDER REAL ESTATE AGENT USER INTERFACE

316 — RENDER POTENTIAL BORROWER USER INTERFACE

502 — A MORTGAGE LOAN ORIGINATOR CREATES AN ACCOUNT

504 — THE MORTGAGE LOAN ORIGINATOR COMPLETES THEIR PROFILE BY ENTERING INFORMATION INTO THE USER INTERFACE.

506 — THE MORTGAGE ACQUISITION SYSTEM SAVES THE PROFILE INFORMATION TO THE DATA STORAGE SYSTEM.

MORTGAGE ACQUISITION SYSTEM

CROSS-REFERENCE TO RELATED APPLICATIONS

This application claims the benefit of priority of U.S. Provisional Patent Application No. 62/663,917 filed on Apr. 27, 2018 and entitled "Mortgage Acquisition System," the entire contents of which are incorporated herein by reference.

FIELD OF THE INVENTION

Embodiments of the present invention relate to home buying, mortgages, other home buying services, and more particularly methods and systems that allow a home buyer to find a mortgage, creating a more privacy-focused and efficient residential mortgage acquisition process.

BACKGROUND OF THE INVENTION

A mortgage is a loan secured by the collateral of a specific real estate property. Home buyers use mortgages to make real estate purchases without having to pay the entire home purchase price up front. Home buyers or home owners seeking a mortgage are potential borrowers.

Lending institutions ("lenders") originate mortgage loans. Mortgage loan origination is the process by which a potential borrower applies for a mortgage loan, and the lender processes, underwrites, closes, and disburses the borrowed funds. Mortgage loan originators ("MLOs") are individuals who work for or on behalf of the lender. Mortgage loan originators work with the potential borrower to complete a mortgage transaction and are typically the primary lender contact for the potential borrower.

Real estate agents work on behalf of the home buyer to complete the real estate transaction. Real estate agents understand the local housing market and the local home buying services market. The home buying services market includes, but is not limited to, mortgage loan originators, hazard insurance agents, title companies, attorneys, home inspectors, repairmen, and surveyors. The real estate agent recommends home buying service providers to home buyers based on previous experiences working with prior home buyers.

The mortgage origination process is comprised of two broad components. The first component is mortgage customer acquisition. Mortgage customer acquisition relates to sales and marketing; this is the process by which potential borrowers and lenders find one another. The second component is mortgage loan manufacturing. Mortgage loan manufacturing relates to mortgage loan processing, underwriting, closing, and funds disbursement. The present invention focuses on the first component, mortgage customer acquisition.

It is financially prudent for potential borrowers to shop around for their mortgage. From a potential borrower's perspective, mortgage shopping is confusing, time consuming, and frequently results in countless cold calls.

From a lender's perspective, mortgage customer acquisition is expensive and inefficient. Lenders use multiple methods (channels) to acquire mortgage customers.

Traditional Retail Branch: Lenders buy or lease "brick and mortar" locations. Loan originators may rely on cross-selling deposit customers or building realtor and other community relationships and relying on referrals from those relationships. Mortgage loan originators are decentralized.

Mass Media: Lenders buy advertising on television, radio, and on the internet. They may also send traditional mailers to prospective customers. These marketing methods drive inbound call volume or online applications. Mortgage loan originators are typically centralized.

Lead Generation: Lenders buy leads from various sources and make outbound calls to prospective customers. Mortgage loan originators are typically centralized.

Portfolio Retention: Lenders try to retain customers that inquire on the payoff amount of their current mortgage or show credit activity indicating a possible payoff. Mortgage loan originators are typically centralized.

BRIEF SUMMARY OF THE INVENTION

Embodiments of the present invention provide a solution to the above described problems by providing methods, systems, and software products that create a more efficient, cost effective, and privacy-focused mortgage marketplace.

Embodiments of the present invention allow real estate agents the ability to identify, maintain, and refer a list of their preferred home buying service providers, including mortgage loan originators, to their home buyers.

Embodiments of the present invention allow potential borrowers to remain anonymous until such time they are comfortable revealing personal identifying information.

Embodiments of the present invention allow potential borrowers to communicate anonymously with individual mortgage loan originators.

Embodiments of the present invention allow potential borrowers to message and request mortgage terms from multiple mortgage loan originators (individuals rather than companies) on the same system.

Embodiments of the present invention create mortgage customer acquisition efficiencies for lenders. A common inefficiency for lenders is the effort required to separate serious potential borrowers from casual or uninterested potential borrowers.

The present invention creates efficiencies for lenders because potential borrower's initiate the communication by messaging and requesting mortgage terms.

Additionally, the present invention creates efficiencies by introducing information that may correlate with more serious potential borrowers. This information may include an indicator that the home buyer is working with a real estate agent, an indicator that the home buyer has completed some or all of their financial document collection and organization, an indicator that the home buyer has completed a budget, or an indicator that the home buyer has found a home.

A key feature of the present invention is potential borrower anonymity, allowing them to proceed further down the mortgage origination path before disclosing their personal identifying information.

BRIEF DESCRIPTION OF THE DRAWINGS

Having thus described embodiments of the invention in general terms, reference will now be made with the accompanying drawings, wherein:

FIG. 1 is a flow chart of a method for mortgage acquisition in accordance with an embodiment of the present invention.

FIG. 2 is a schematic diagram of an example of a system for a mortgage acquisition system in accordance with an embodiment of the present invention.

FIG. 3 is flow chart of a method of user type identification process in accordance with an embodiment of the present invention.

Figure 4:
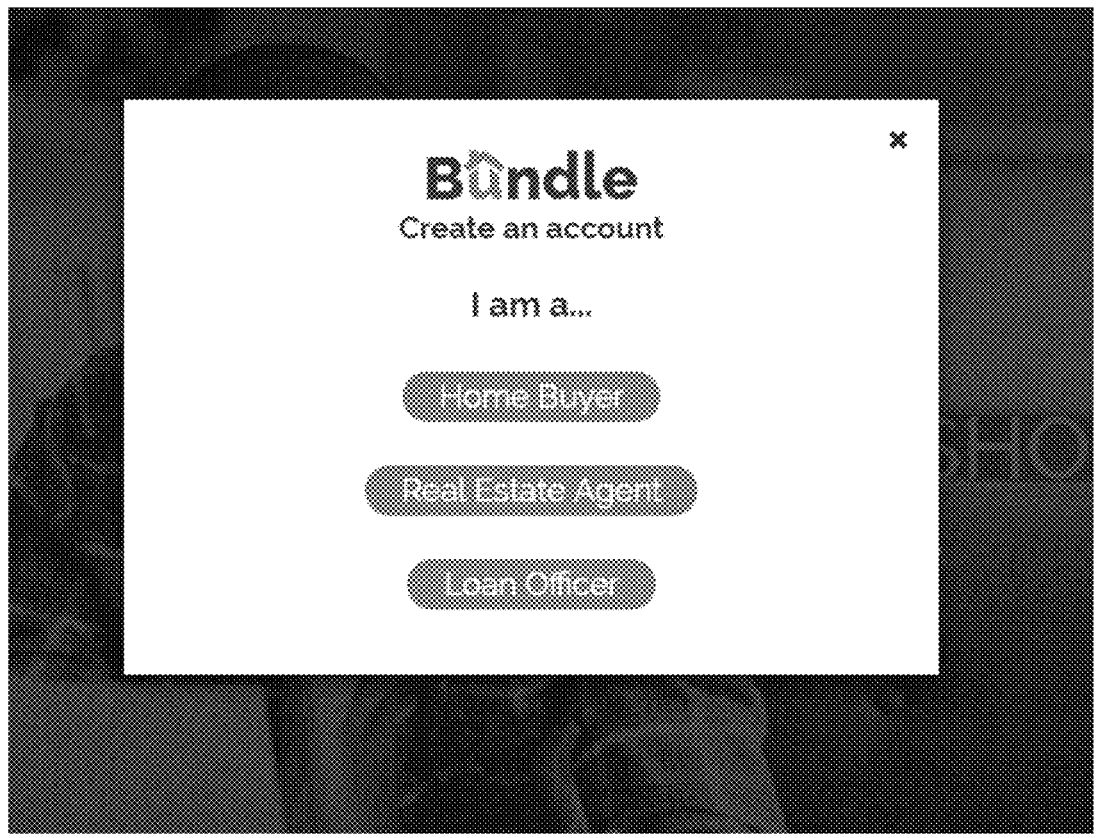

FIG. 4 provides an example of the implementation of the method of FIG. 3.

FIG. 5 is a flow chart of a method for a mortgage loan originator account initiation in accordance with an embodiment of the present invention.

Figure 6:
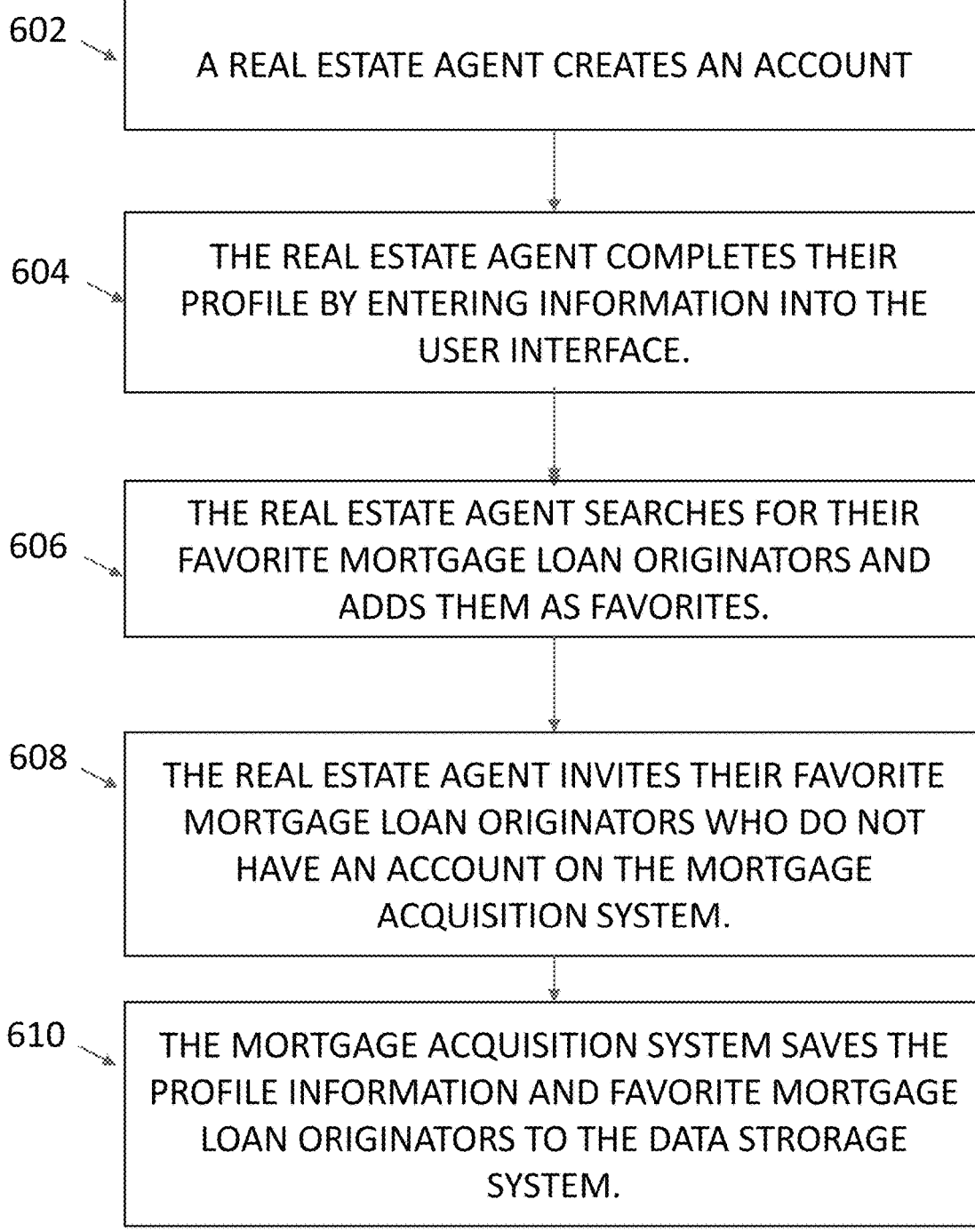

FIG. 6 is a flow chart of a method for a real estate agent account initiation in accordance with an embodiment of the present invention.

Figure 7:
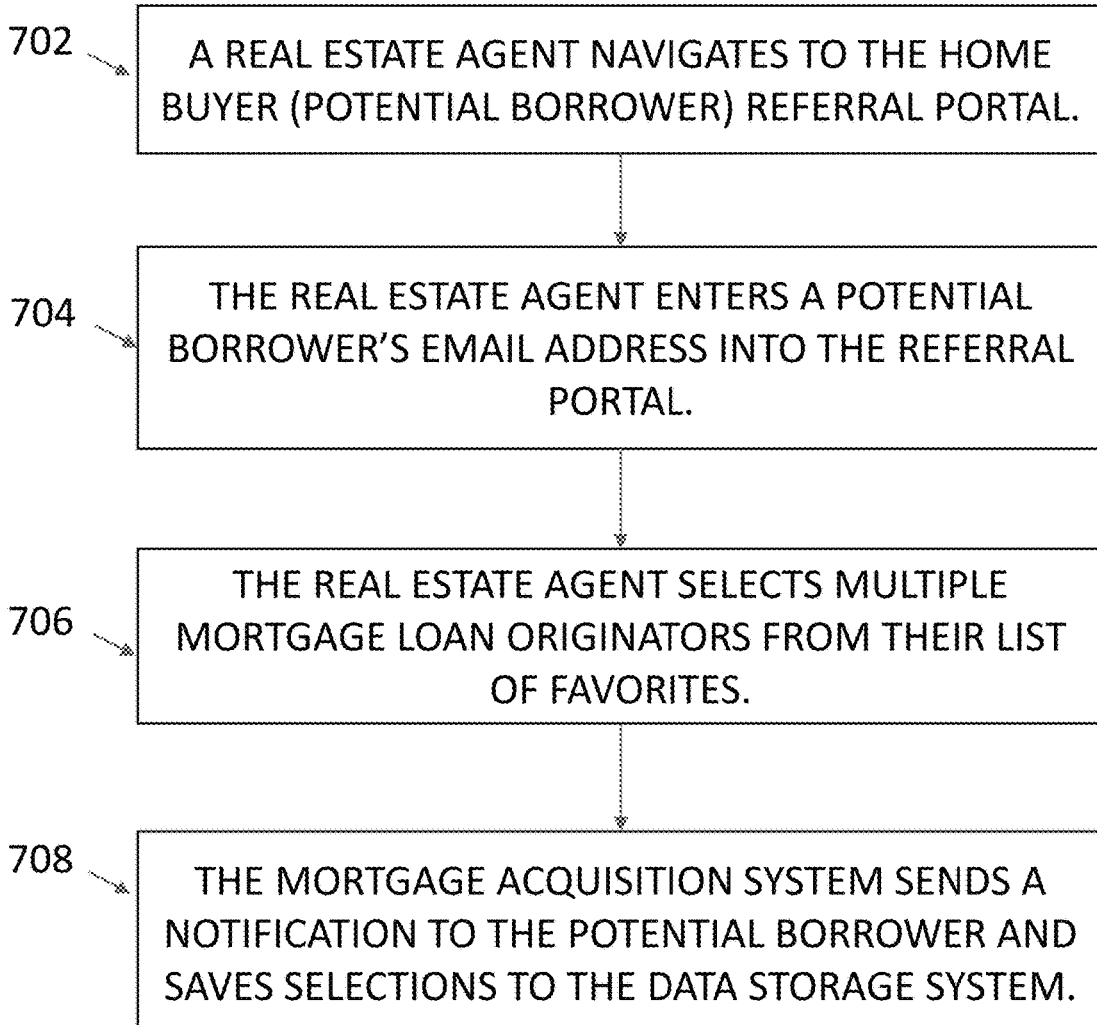

FIG. 7 is a flow chart of a method for a real estate agent referring a potential borrower to the mortgage acquisition system in accordance with an embodiment of the present invention.

Figure 8:
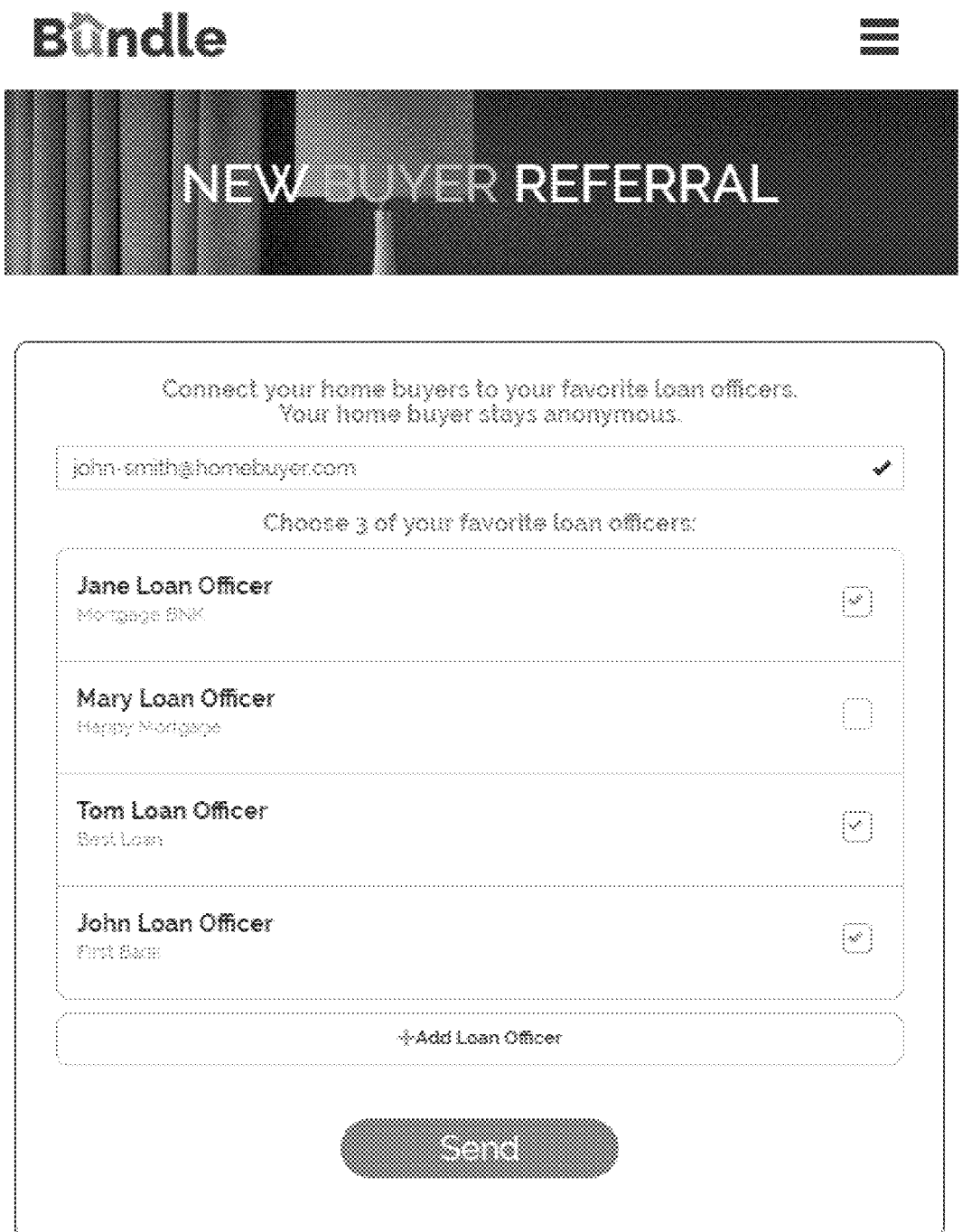

FIG. 8 provides an example of the implementation of the method of FIG. 7.

Figure 9:
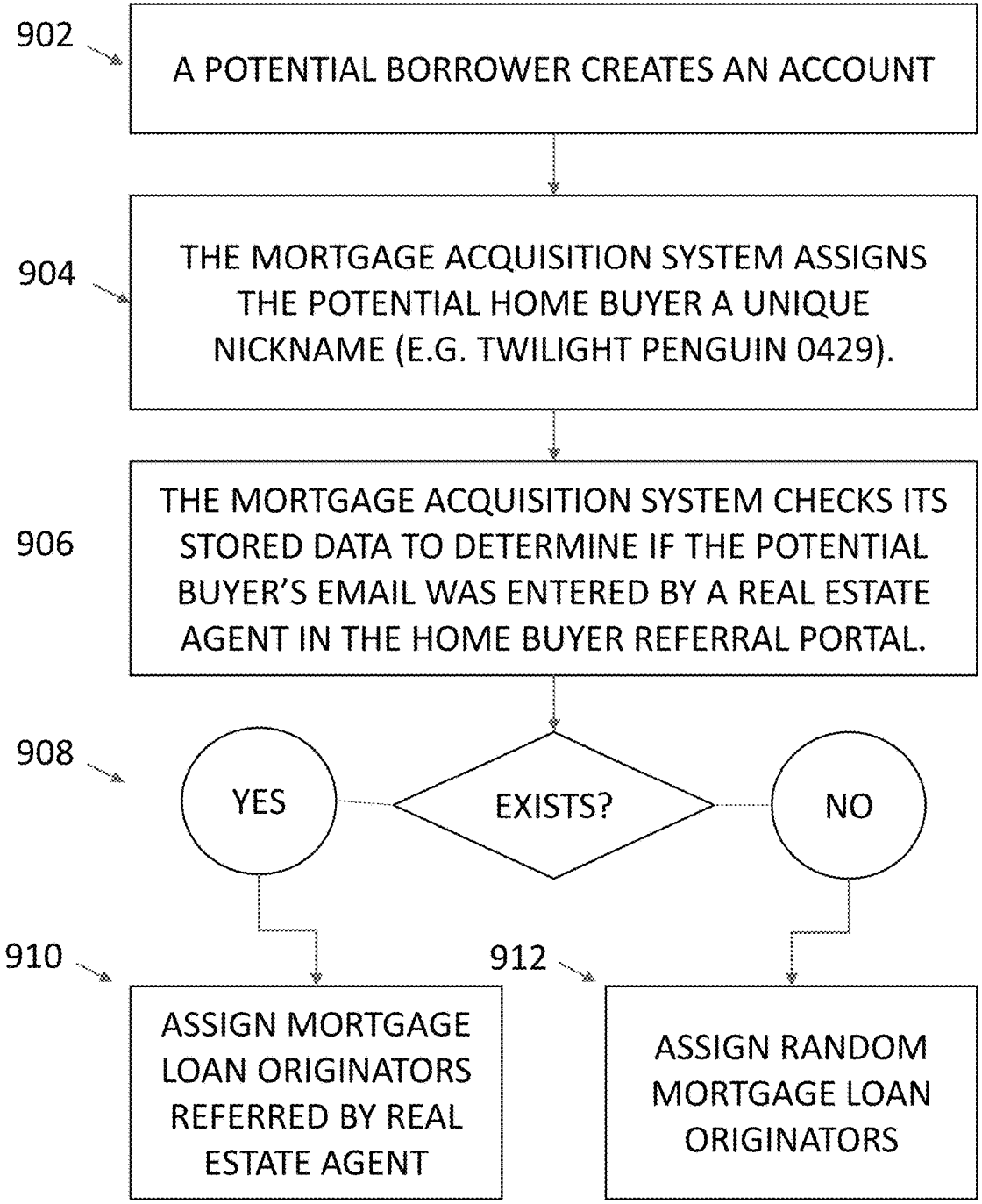

FIG. 9 is a flow chart of a method for a potential borrower account initiation in accordance with an embodiment of the present invention.

Figure 10:
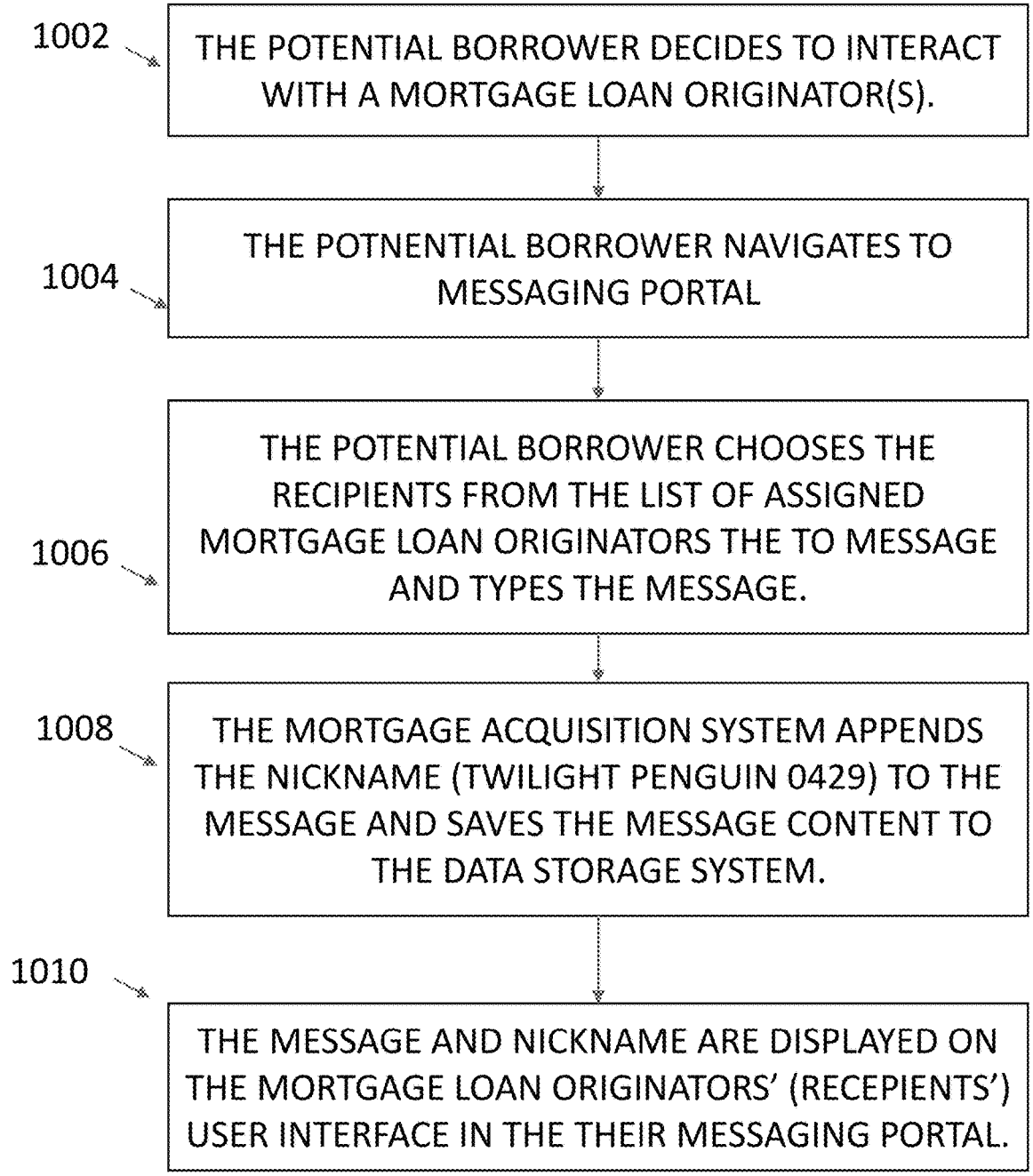

FIG. 10 is a flow chart of a method for a potential borrower to anonymously message with mortgage loan originators in accordance with an embodiment of the present invention.

Figure 11:
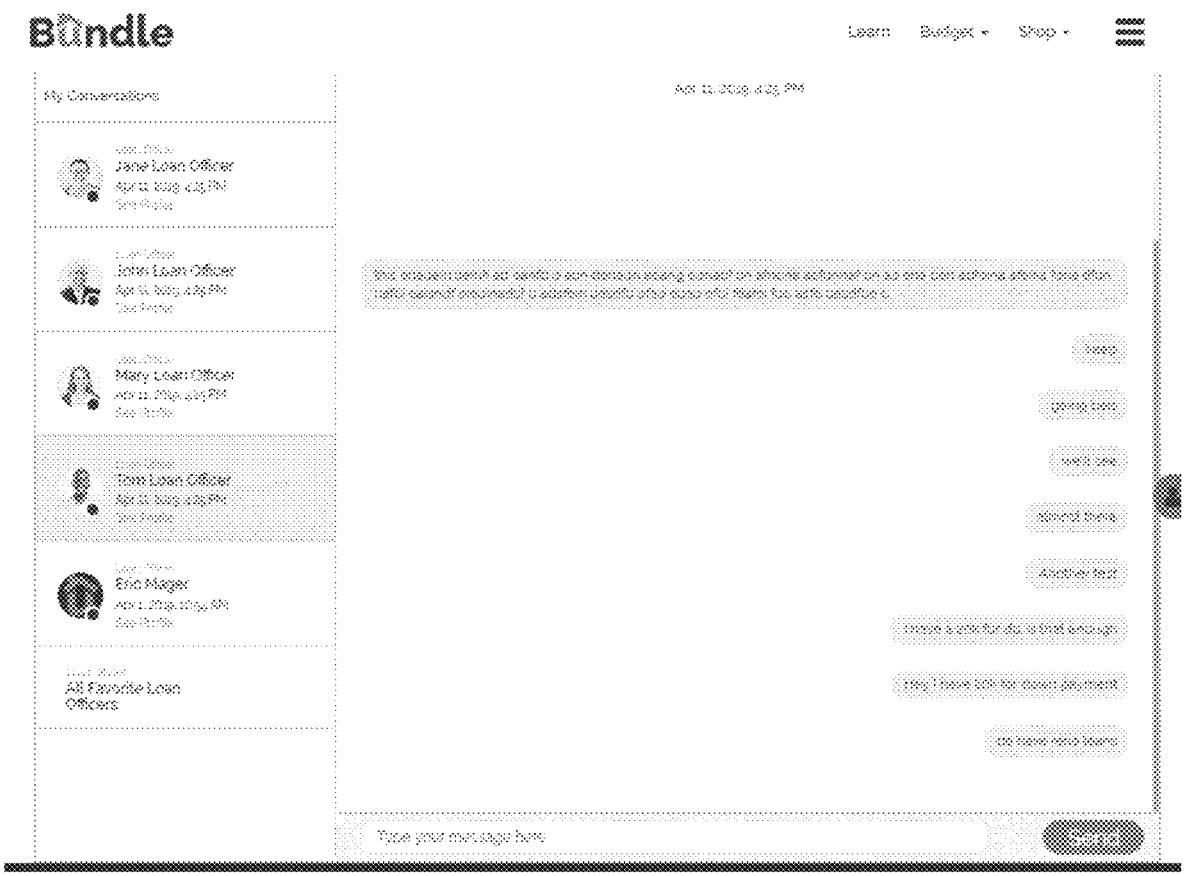

FIG. 11 provides an example, from the potential borrower's point of view, of the implementation of the method of FIG. 10.

Figure 12:
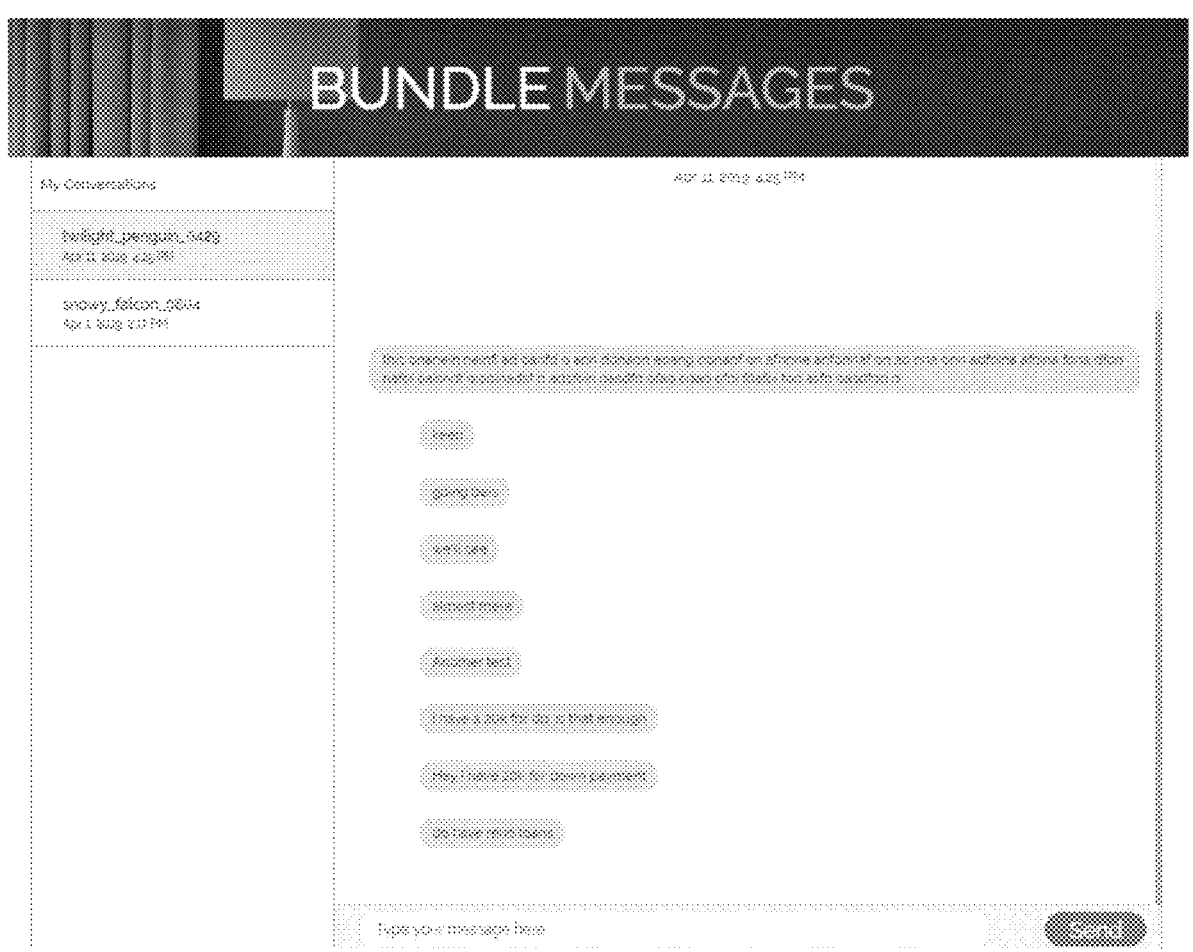

FIG. 12 provides an example, from the mortgage loan originator's point of view, of the implementation of the method of FIG. 10.

Figure 13:
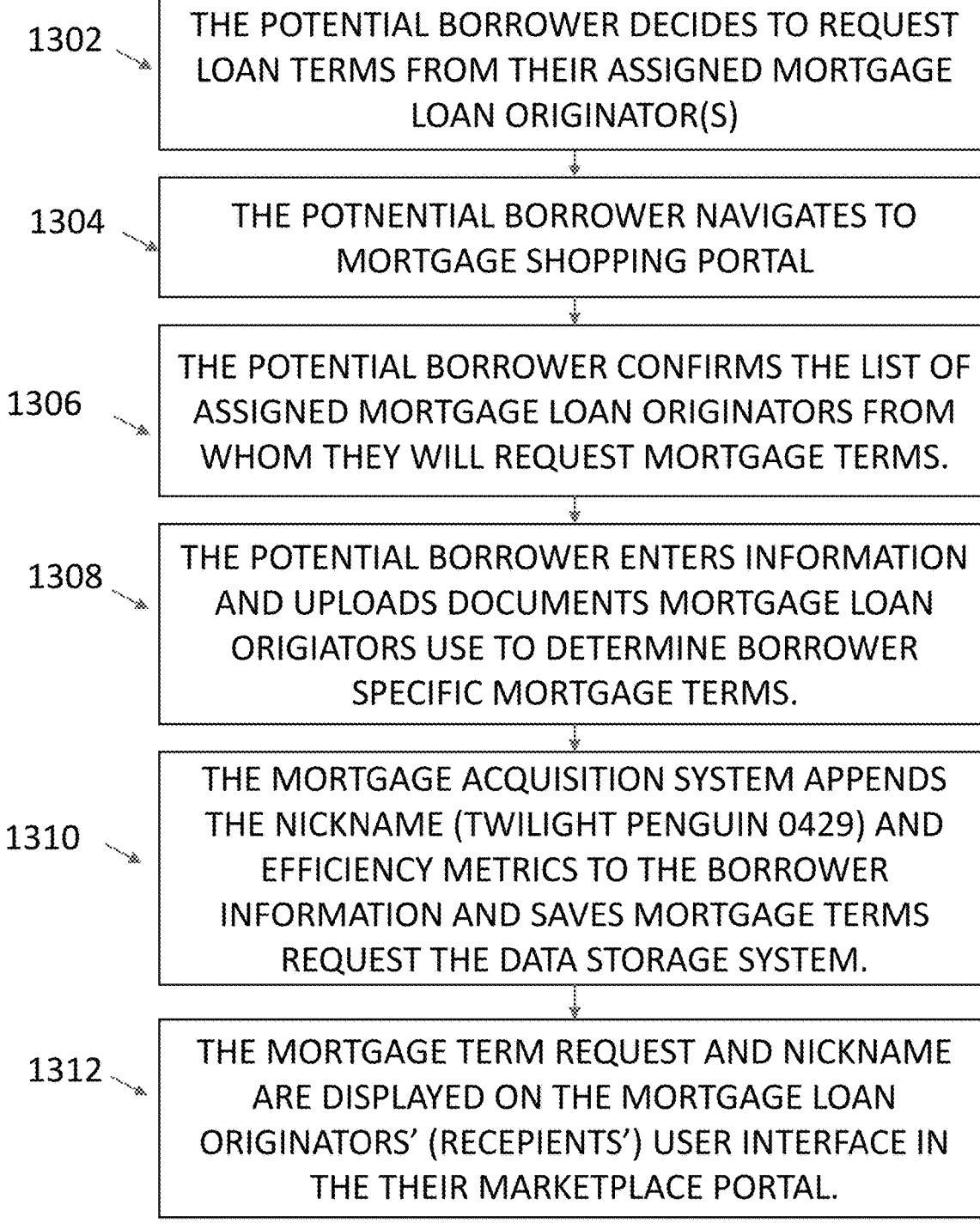

FIG. 13 is a flow chart of a method for a potential borrower to anonymously request mortgage terms from mortgage loan originators in accordance with an embodiment of the present invention.

Figure 14:
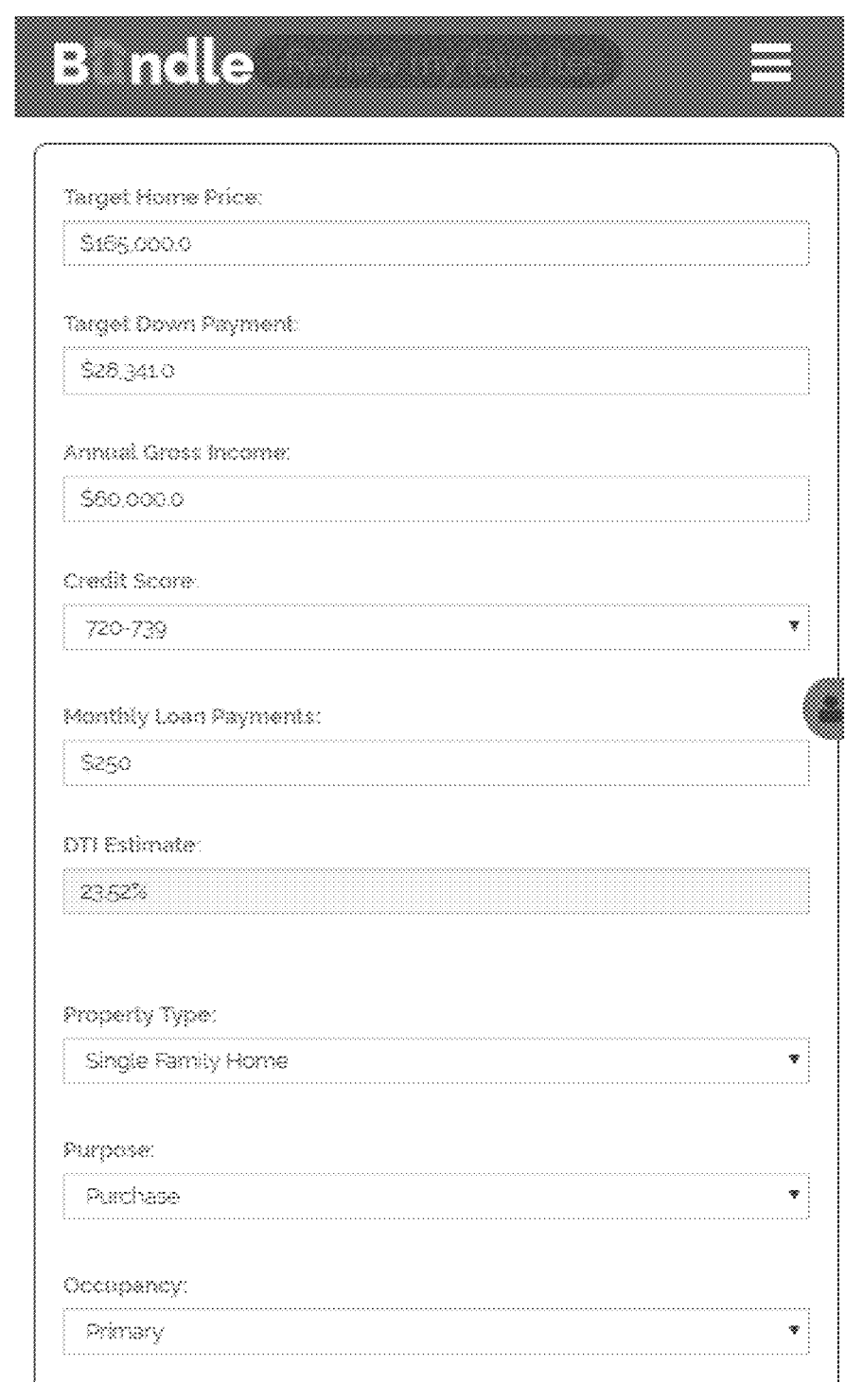

FIG. 14 provides an example, from the potential borrower's point of view, of the implementation of the method of FIG. 13.

Figure 15:
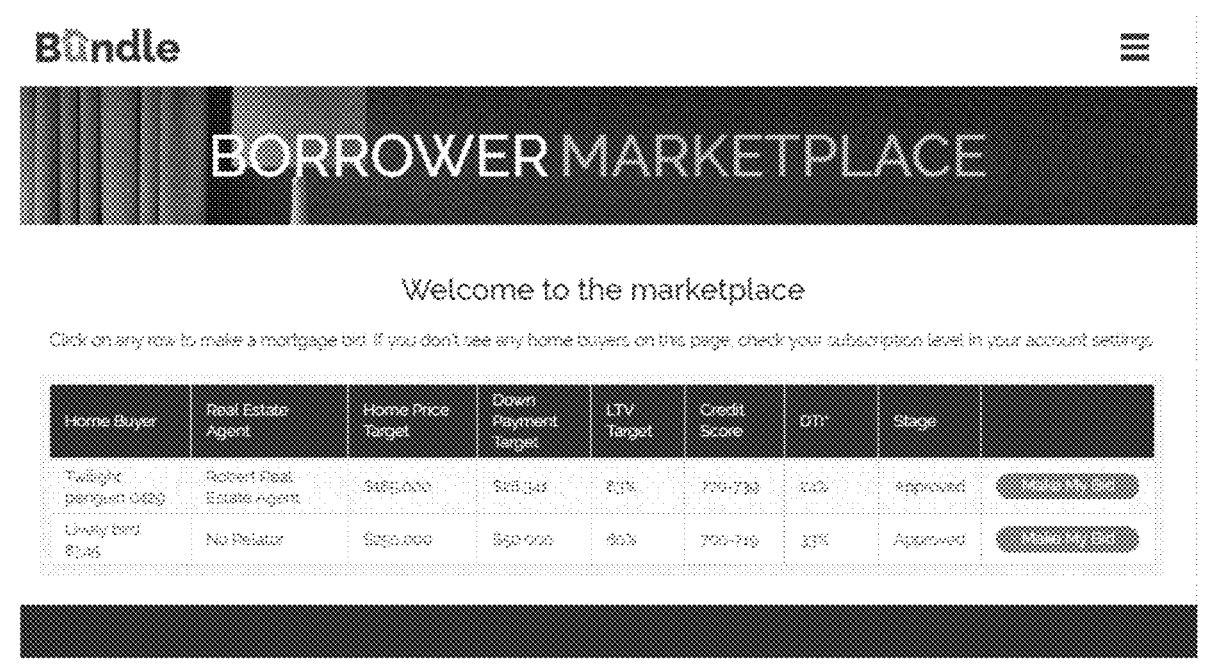

FIG. 15 provides an example, from the mortgage loan originator's point of view, of the implementation of the method of FIG. 13.

Figure 16:
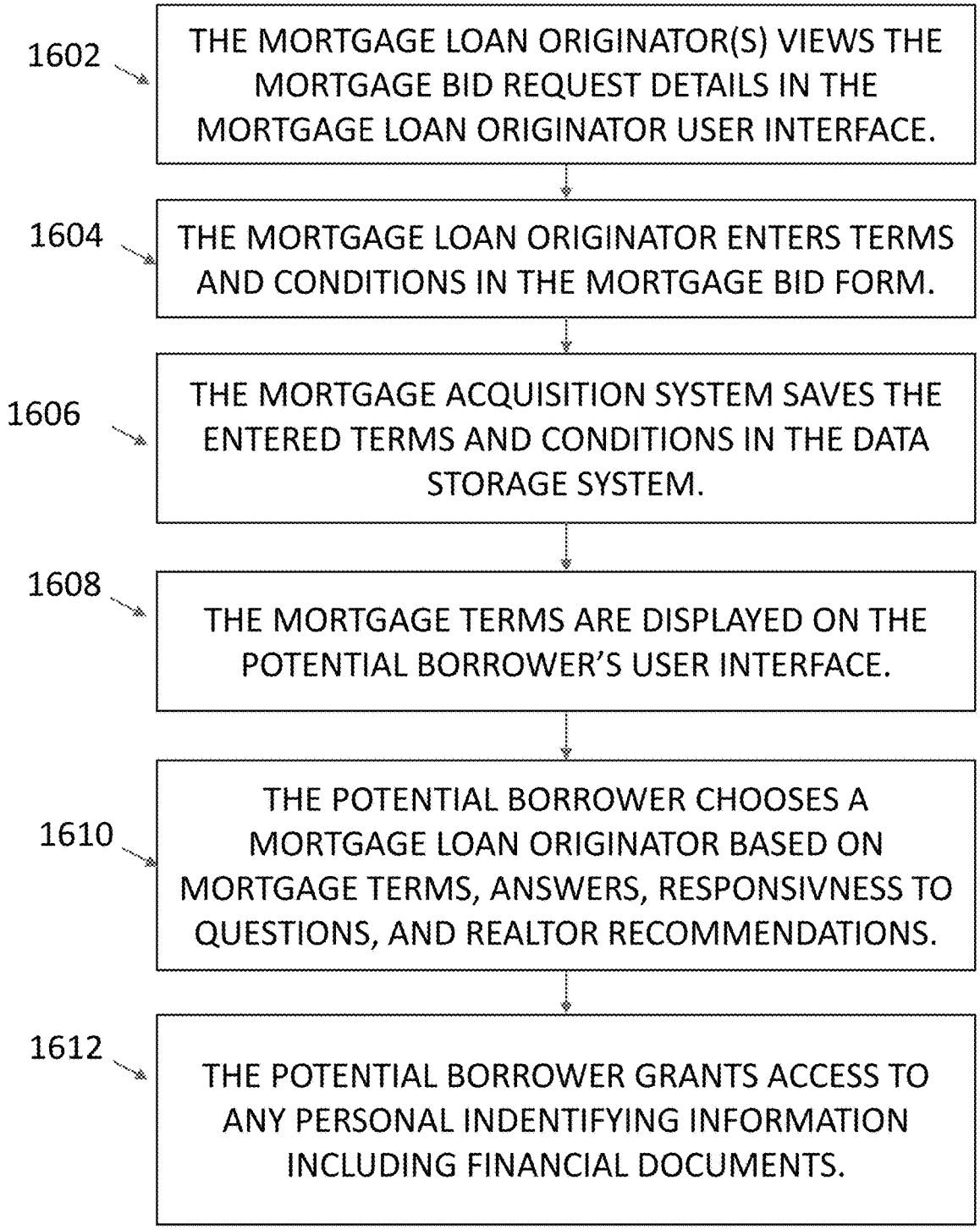

FIG. 16 is a flow chart of a method for a mortgage loan originator to submit mortgage terms and conditions to the potential borrower requesting such terms in FIG. 13 in accordance with an embodiment of the present invention.

Figure 17:
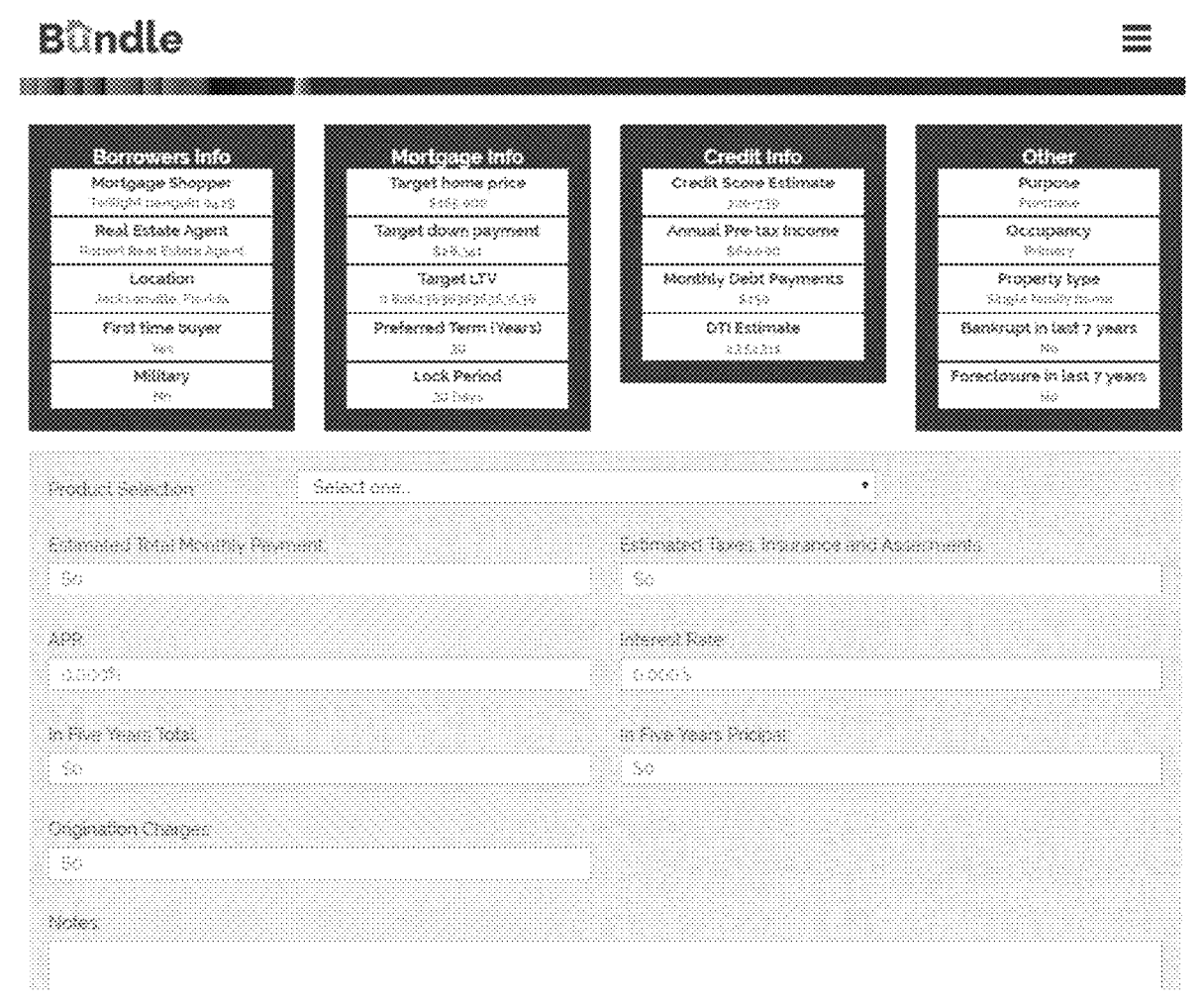

FIG. 17 provides an example, from the mortgage loan originator's point of view, of the implementation of the method of FIG. 16.

Figure 18:

FIG. 18 provides an example, from the potential borrower's point of view, of the implementation of the method of FIG. 16.

Figure 19:
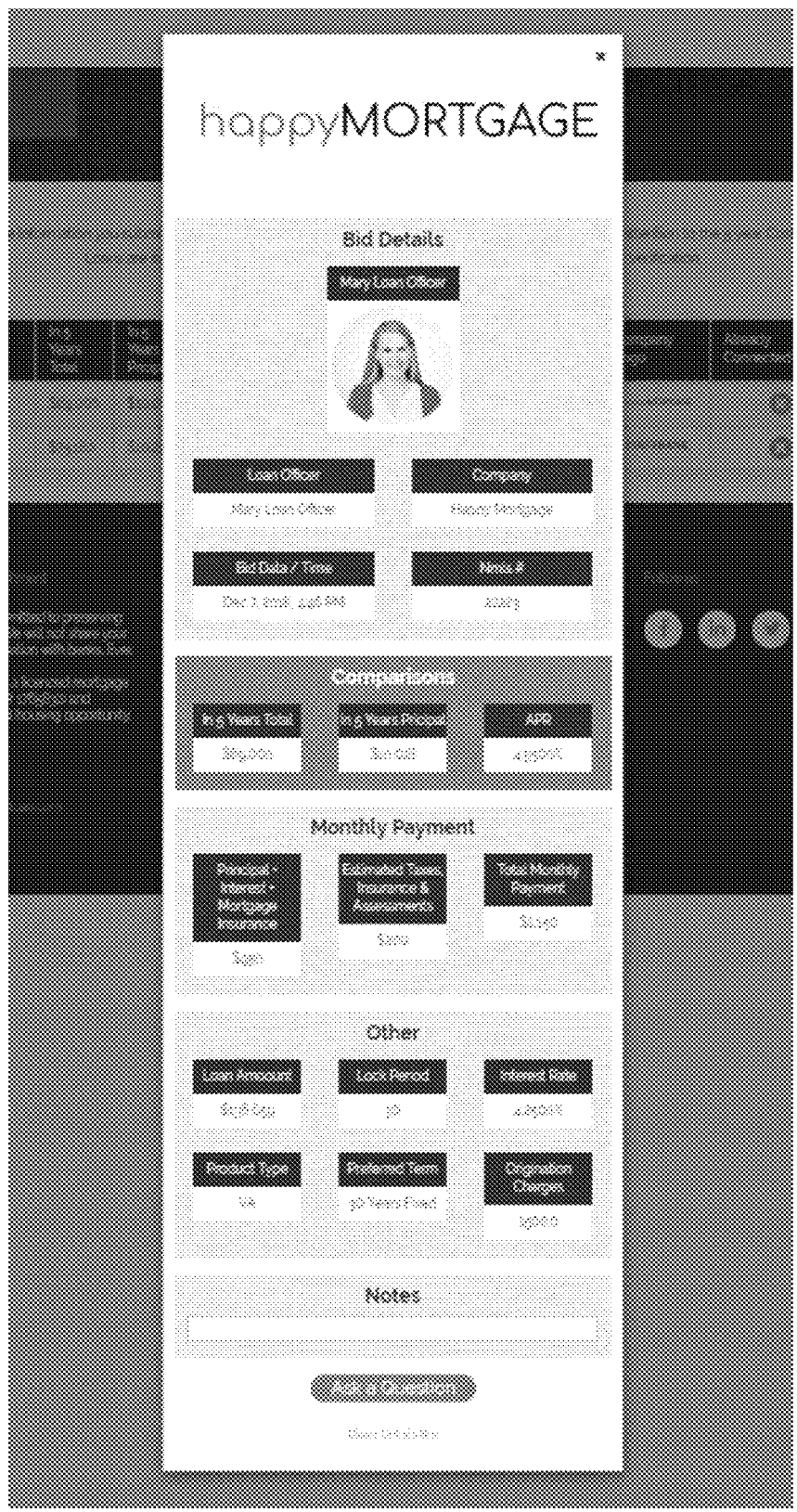

FIG. 19 provides an example, from the potential borrower's point of view, of the implementation of the method of FIG. 16.

DETAILED DESCRIPTION OF THE INVENTION

Embodiments of the present invention will now be described in more detail and with reference to the accompanying drawings. The present invention may be embodied in many different forms and should not be limited to the embodiments described herein.

It should be understood that there are other service providers associated with the home buying process, including but not limited to, hazard insurance agents, title companies, home repair companies, home inspectors, land surveyors, and utility providers. The embodiments described below show details of the home buyer's interaction with a mortgage loan originator, but other embodiments of the present invention may include other home buying service providers.

FIG. 1 is a flow chart of a method (100) for mortgage acquisition in accordance with an embodiment of the present invention. As shown in block (102) the home buyer determines they need to or want to borrow money to cover the entire price or a portion of the price of the home they are purchasing. As shown in block (104) the borrower determines they want to compare lenders and mortgage loan originators. The buyer may want to compare interest rates, fees, or other financial or contractual terms or conditions of borrowing money in the form of a mortgage loan. Additionally, the buyer may compare reviews, consultation quality, responsiveness, historical closing timelines, or other measures of customer service levels.

FIG. 2 is a schematic diagram of an example of a mortgage acquisition system (200) in accordance with an embodiment of the present invention. The system is comprised of a server (202) and can be accessed by users through multiple clients (214). Users may be potential borrowers, real estate agents, mortgage loan originators, or system administrators. The server is a centralized system comprised of a server network interface (204), a processor (206), and a data storage system (208). The server network interface (204) connects to client network interfaces (216) as a means of electronic communication between the server and clients. The processor (206) instructs parts of the server to complete tasks, such as mathematical computations, saving data to the data storage system, erasing data from the data storage system, and sending data through the network interface, based on instructions it receives from stored procedures, user requests, and other software instructions. The data storage system stores digital assets of the mortgage acquisition system including, but not limited to, stored procedures, data input of users, and files input by users. The clients (214) allow users to access the server using a client network interface (216) and user interface (218). Clients (214) may include, but are not limited to desktop personal computers, mobile phones, tablets, laptops, or other electronic devices that are able to connect to the server using a network interface. A client interacts with the mortgage acquisition system using a user interface (218). The user interface allows the user to view content and information on their client with a display, such as a computer monitor, and enter and save data, using input hardware, such as a keyboard or computer mouse, all of which are components of the clients.

FIG. 3 is flow chart of a method (300) of a user type identification process in accordance with an embodiment of the present invention. Each user type (306, 308, 310) has unique functions they need to perform in the mortgage acquisition process. As such, each user type requires a specific user interface (312, 314, 316) that facilitates the unique function of each user type. Every user can access a general user interface (302). When the user chooses to create an account from the general user interface, the user will select their user type (304). When the user selects, the server will send the files required to the client to render the correct user interface.

FIG. 4 provides an example of the implementation of the method of FIG. 3.

FIG. 5 is a flow chart of a method (500) for a mortgage loan originator account initiation in accordance with an embodiment of the present invention. The mortgage loan originator chooses to create an account (502). The mortgage loan originator enters data into the the user interface that is pertinent to the functions they will complete in the mortgage acquisition system (504). This data may include, but is not limited to, the mortgage loan originator's name, business property address, contact information, state licensing information, federal licensing information, employer information, employer logo, mortgage product offerings, and disclosures. The mortgage loan originator selects, through the user interface, to save their information to the server's data storage system (506).

FIG. 6 is a flow chart of a method for a real estate agent account initiation in accordance with an embodiment of the present invention. The real estate agent chooses to create an account (602). The real estate agent enters data into the user interface that is pertinent to the functions they will complete in the mortgage acquisition system (604). This data may include, but is not limited to, the real estate agent's name, business property address, contact information, state licensing information, federal licensing information, employer information, employer logo, and disclosures. The real estate agent will designate their favorite mortgage loan originators by searching for the mortgage loan originators who have previously created an account in the mortgage acquisition system (606). If the real estate agent does not find the person for whom they are searching in the mortgage acquisition system, they can invite a mortgage loan originator by entering the mortgage loan originator's email address. The mortgage acquisition system will send an email invite to the invited mortgage loan originators (608). The real estate agent selects, through the user interface, to save their information to the server's data storage system (610).

FIG. 7 is a flow chart of a method (600) for a real estate agent referring a potential borrower to the mortgage acquisition system in accordance with an embodiment of the present invention. The real estate agent navigates to the referral portal (704) of the real estate agent specific user interface and enters the email address of the potential borrower into a form field. The real estate agent will be presented with a list of their favorite mortgage loan originators that were previously chosen (606, 608) and selects the mortgage loan originators they want to refer to the potential borrower (706). The mortgage acquisition saves the potential borrower's email address in the data storage system so that the system can assign the mortgage loan originators chosen by the real estate agent when the potential buyer logs into the mortgage acquisition system (708). The mortgage acquisition system notifies the potential borrower by sending an email using the server network interface.

FIG. 8 provides an example of the implementation of the method of FIG. 7. In the example the real estate agent has chosen "Jane Loan Officer", "Tom Loan Officer", and "John Loan Officer" for their home buyer and potential borrower who has the email address john-smith@homebuyer.com.

FIG. 9 is a flow chart of a method (900) for a potential borrower account initiation in accordance with an embodiment of the present invention. Once the potential borrower creates an account the mortgage acquisition system assigns a nickname to the potential borrower (904). This will allow the mortgage loan originators interact with the potential borrower while keeping the potential borrower in control of the interaction and their contact information and other personal identifying information. The mortgage acquisition system will also check the data storage system to determine if the potential borrower's email address was previously entered and saved by a real estate agent (708). If the email address does exist (908) and was entered by the real estate agent, the mortgage loan originators chosen by the real estate agent are assigned to the potential borrower (910). If the email address does not exist (908) and was not entered by the real estate agent, the mortgage acquisition system will automatically assign mortgage loan originators to the potential borrower (912). This assignment allows the potential borrower to interact with these assigned mortgage loan originators anonymously through a messaging portal and a mortgage terms request portal. The potential borrower may also add, remove, or change any of the assigned mortgage loan originators. The anonymity prevents the mortgage loan originators from knowing the potential buyer's email address and phone number. The anonymity prevents unwanted spam email and cold calls from mortgage loan originators.

FIG. 10 is a flow chart of a method (1000) for a potential borrower to anonymously message with mortgage loan originators in accordance with an embodiment of the present invention. The potential borrower is in control and decides when to the initiate the messaging conversation (1002). The mortgage loan originator does not have the ability to initiate the messaging conversation. The potential borrower navigates to the messaging portal in the home buyer user interface (1004). The list of favorite mortgage loan originators appears that were previously assigned (910, 912). The potential borrower may also add, remove, or change any of the assigned mortgage loan originators. The potential borrower can choose to message all of their favorite mortgage loan originators at the same time or to message a mortgage loan originator individually (1006). The potential borrower will type their message in using a keyboard of the client and choose to send the message (1006). The mortgage acquisition system appends the previously assigned nickname of the potential borrower (904) and saves the message to the data storage system (1008). The mortgage acquisition network interface sends a notification email to the mortgage loan originator message recipient(s) and the recipients can access and view the message in the mortgage loan originator user interface (1010).

FIG. 11 provides an example, from the potential borrower's point of view, of the implementation of the method of FIG. 10. The list of assigned mortgage loan originators are shown on the left hand side. The potential borrower can message all of them at the same time or message them individually.

FIG. 12 provides an example, from the mortgage loan originator's point of view, of the implementation of the method of FIG. 10. The mortgage loan originator sees the potential borrower's nickname, in this case twilight penguin 0429 instead of any personal identifying information. The mortgage loan originator is still able to follow the conversation and see the message history.

FIG. 13 is a flow chart of a method (1300) for a potential borrower to anonymously request mortgage terms from mortgage loan originators in accordance with an embodiment of the present invention. Mortgage terms may include, but are not limited to, mortgage quotes, mortgage bids, mortgage conditions, interest rates, fee information, payment information, insurance premiums, and other mortgage comparison metrics. The potential borrower chooses to request mortgage terms (1302) from the previously assigned mortgage loan originators (910, 912). The potential borrower navigates to the mortgage shopping portal in the home buyer user interface (1304). The borrower has the ability to confirm the previously assigned (910, 912) mortgage loan originators that will receive the mortgage terms request (1306). The potential borrower may add, remove, or change any of the assigned mortgage loan originators. A mortgage terms request is a process by which a potential borrower submits specific financial and other data (1308) to mortgage loan originators and requests those mortgage loan originators use that submitted data to send back mortgage terms and conditions for the potential borrower. The information submitted by the potential borrower may include, but is not limited to, the potentials borrower's income, credit, debt payments, occupancy (primary residence, investment home, $2^{nd}$ home), property type (single family, condominium, townhome), credit history, home price, down payment, or other specific credit or financial information that may impact mortgage terms. In addition to information regarding credit worthiness, the system may also append information (1310) that enables the mortgage loan originator to determine how serious the potential borrower is or how likely the potential borrower is to a applying for a mortgage loan. This additional information can be used to increase efficiency in the mortgage acquisition process. This efficiency information may include an indicator that the home buyer is working with a real estate agent, an indicator that the home buyer has completed some or all of their financial document collection and organization, an indicator that information submitted has been validated, confirmed, or estimated, an indicator that the home buyer has completed a budget, and indicator that the home buyer has placed a deposit in escrow with the mortgage acquisition system, or an indicator that the home buyer has found a home. Although the mortgage acquisition system saves financial documents (uploaded or otherwise transferred to the mortgage acquisition system) typically used to validate information needed to determine a potential borrowers credit worthiness to its data storage system (1308), the mortgage acquisition system does not allow mortgage loan originators to see any financial documents that may contain personal identifying information when the potential borrower requests mortgage terms. The mortgage acquisition system may use document reading technology, application programming interface, web hooks, or other digital communication methods to validate, verify, or estimate any of the information submitted in the mortgage term request. The mortgage acquisition system appends the previously assigned nickname of the potential borrower (904) and saves the mortgage terms request information and financial documents to the data storage system (1310). The mortgage acquisition network interface sends a notification email to the mortgage loan originator terms request recipient (s) and the recipients can access and view the mortgage terms request information in the mortgage loan originator user interface (1312).

FIG. 14 provides an example, from the potential borrower's point of view, of the implementation of the method of FIG. 13.

FIG. 15 provides an example, from the mortgage loan originator's point of view, of the implementation of the method of FIG. 13.

FIG. 16 is a flow chart of a method (1600) for a mortgage loan originator to submit mortgage terms and conditions to the potential borrower requesting such terms in FIG. 13 in accordance with an embodiment of the present invention. The mortgage loan originator accesses the potential borrower's mortgage term request information in the mortgage loan originator user interface (1602). The mortgage loan originator enters mortgage terms in the mortgage acquisition system user interface (1604). As this embodiment of the present invention should not be limiting, information may be retrieved, processed, entered or otherwise communicated to the mortgage acquisition system through application programming interface, web hooks, or other digital communication methods. The mortgage terms are saved in the mortgage acquisition system (1606) and can be displayed in the potential borrower's user interface (1608). The potential borrower is able to make a decision on a mortgage loan originator (1610) based on information gathered in the messaging communication method (1000) and mortgage terms communication methods (1300, 1600). The potential borrower stays anonymous through the entire mortgage acquisition process if they choose to. The mortgage acquisition system allows the potential borrower to be more in control, eliminating sales pressure, eliminating unwanted emails and phone calls. Once the potential borrower makes a decision, they can schedule a meeting by through the messaging portal (1300) or call or email the mortgage loan officer directly by accessing the mortgage loan officer's contact information on the profile page of the mortgage acquisition system.

FIG. 17 provides an example, from the mortgage loan originator's point of view, of the implementation of the method of FIG. 16.

FIG. 18 provides an example, from the potential borrower's point of view, of the implementation of the method of FIG. 16.

FIG. 19 provides an example, from the potential borrower's point of view, of the implementation of the method of FIG. 16.

The invention claimed is:

1. A method comprising:
receiving, at a third party server, a request from a user for mortgage terms by mortgage officers;
in response to receiving the request, transmitting, by the third party server, a first user interface to a computer of the user over at least one network to allow the user to enter into the first user interface data relevant to obtaining a mortgage;
receiving the data, at the third party server over the at least one network from the computer of the user via the first user interface, in response to the user entering in the data into the first user interface;
creating, by the third party server, using the received data: borrower information including a home value, a down payment, and a mortgage term, and receiving and transmitting chat messages of the user and chat messages of the mortgage officers;
assigning, by the third party server, one or more mortgage officers to the user;
assigning, by the third party server, an anonymous unique identifier to the borrower information;
creating, by the third party server, anonymous request information, by appending the anonymous unique identifier to the borrower information instead of using any contact information so that the anonymous request information does not include information that specifically identifies the user, and relaying the chat messages of the user identifying the user with the anonymous unique identifier instead of using any contact information of the user, the contact information comprising an address, email address or phone number for contacting a user;
transmitting, from the third party server, a second user interface to computers of the mortgage officers over the at least one network;

transmitting the anonymous request information and the chat messages of the user from the third party server to the one or more mortgage officers over the at least one network via the second user interface;

receiving, by the third party server from each computer of the mortgage officers via the second user interface: (1) mortgage loan offers, each mortgage loan offer comprising: a mortgage interest rate, a mortgage company and a mortgage officer: and (2) chat messages of the mortgage officers;

transmitting, from the third party server, the mortgage loan offers and the chat messages of the mortgage officers, through the first user interface via the at least one network, so that the user can view the mortgage loan offers and make a selection of a selected mortgage officer from among the mortgage loan offers via the first user interface, wherein upon transmitting the mortgage loan offers, the third party server transmits to the user contact information of the selected mortgage officer so that the user can directly interact with the selected mortgage officer without the third party server.

2. The method of claim 1, further comprising:
receiving, at the third party server from the first user interface, the selected mortgage officer among the mortgage officers.

3. The method of claim 1, further comprising:
transmitting, by the third party server to a computer of the selected mortgage officer through the at least one network via the second user interface, information indicating that the selected mortgage officer has been selected via the first user interface; and
transmitting, to the first user interface, the anonymous request information to the selected loan officer over the at least one network.

4. The method of claim 1, wherein the third party server stores the contact information of the user but prevents transmission of the contact information while allowing data and the chat messages of the user to be transmitted between the first and second interfaces.

5. A system comprising:
a processor configured for:
receiving a request from a user for mortgage terms by mortgage officers;
in response to receiving the request, transmitting a first user interface to a computer of the user over at least one network to allow the user to enter into the first user interface data relevant to obtaining a mortgage;
receiving the data, over the at least one network from the computer of the user via the first user interface, in response to the user entering in the data into the first user interface;
creating using the received data: borrower information including a home value, a down payment, a mortgage term, and receiving and transmitting chat messages of the user and chat messages of the mortgage officers;
assigning one or more mortgage officers to the user;
assigning an anonymous unique identifier to the borrower information;
creating anonymous request information, by appending the anonymous unique identifier to the borrower information instead of using any contact information so that the anonymous request information does not include information that specifically identifies the user, and relaying the chat messages of the user identifying the user with the anonymous unique identifier instead of using any contact information of the user, the contact information comprising an address, email address or phone number for contacting a user;
transmitting, from the third party server, a second user interface to computers of the mortgage officers over the at least one network;
transmitting the anonymous request information and the chat messages of the user from the third party server to the one or more mortgage officers over the at least one network via the second user interface;
receiving from each computer of the mortgage officers via the second user interface: (1) mortgage loan offers, each mortgage loan offer comprising: a mortgage interest rate, a mortgage company and a mortgage officer: and (2) chat messages of the mortgage officers;
transmitting the mortgage loan offers and the chat messages of the mortgage officers, through the first user interface through the at least one network, so that the user can view the mortgage loan offers and make a selection of a selected mortgage officer from among the mortgage loan offers via the first user interface,
wherein upon transmitting the mortgage loan offers, the third party server transmits to the user contact information of the selected mortgage officer so that the user can directly interact with the selected mortgage officer without the third party server.

6. A non-transitory computer readable medium storing instructions that, when executed by a processor, performs a method, the method comprising:
receiving a request from a user for mortgage terms by mortgage officers;
in response to receiving the request, transmitting a first user interface to a computer of the user over at least one network to allow the user to enter into the first user interface data relevant to obtaining a mortgage;
receiving the data, over the at least one network from the computer of the user via the first user interface, in response to the user entering in the data into the first user interface;
creating using the received data: borrower information including a home value, a down payment, a mortgage term, and receiving and transmitting chat messages of the user and chat messages of the mortgage officers;
assigning one or more mortgage officers to the user;
assigning an anonymous unique identifier to the borrower information;
creating anonymous request information, by appending the anonymous unique identifier to the borrower information instead of using any contact information so that the anonymous request information does not include information that specifically identifies the user, and relaying the chat messages of the user identifying the user with the anonymous unique identifier instead of using any contact information of the user, the contact information comprising an address, email address or phone number for contacting a user;
transmitting, from the third party server, a second user interface to computers of the mortgage officers over the at least one network;
transmitting the anonymous request information and the chat messages of the user from the third party server to the one or more mortgage officers over the at least one network via the second user interface;

receiving from each computer of the mortgage officers via the second user interface: (1) mortgage loan offers, each mortgage loan offer comprising: a mortgage interest rate, a mortgage company and a mortgage officer: and (2) chat messages of the mortgage officers;

transmitting the mortgage loan offers and the chat messages of the mortgage officers, through the first user interface through the at least one network, so that the user can view the mortgage loan offers and make a selection of a selected mortgage officer from among the mortgage loan offers via the first user interface, wherein upon transmitting the mortgage loan offers, the third party server transmits to the user contact information of the selected mortgage officer so that the user can directly interact with the selected mortgage officer without the third party server.

* * * * *